United States Patent
Suratman et al.

(10) Patent No.: US 8,149,528 B1
(45) Date of Patent: Apr. 3, 2012

(54) DISK DRIVE CONNECTING DEFECT SHAPES TO PREEMPT DATA LOSS

(75) Inventors: Dody Suratman, Trabuco Canyon, CA (US); Chirag C. Patel, Rancho Santa Margarita, CA (US); Chun Sei Tsai, Tustin, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 131 days.

(21) Appl. No.: 12/552,912

(22) Filed: Sep. 2, 2009

(51) Int. Cl.
*G11B 27/36* (2006.01)
(52) U.S. Cl. .......................................... 360/31
(58) Field of Classification Search .................. None
See application file for complete search history.

(56) References Cited

U.S. PATENT DOCUMENTS

| | | | |
|---|---|---|---|
| 6,223,303 B1 | 4/2001 | Billings et al. | |
| 6,281,676 B1 | 8/2001 | Ottesen et al. | |
| 6,292,316 B1 * | 9/2001 | Dietzel et al. | 360/31 |
| 6,862,150 B1 | 3/2005 | Eto | |
| 6,876,445 B2 | 4/2005 | Shibuya et al. | |
| 6,985,319 B2 | 1/2006 | Yip et al. | |
| 7,047,438 B2 * | 5/2006 | Smith et al. | 714/6.13 |
| 7,072,129 B1 | 7/2006 | Cullen et al. | |
| 7,139,145 B1 * | 11/2006 | Archibald et al. | 360/53 |
| 2001/0055172 A1 | 12/2001 | Yip et al. | |
| 2002/0181133 A1 | 12/2002 | Koshkina et al. | |
| 2002/0191319 A1 | 12/2002 | Liew et al. | |
| 2006/0056088 A1 | 3/2006 | Kudoh et al. | |
| 2007/0146921 A1 | 6/2007 | Jun | |
| 2007/0271487 A1 | 11/2007 | Maeda et al. | |

* cited by examiner

*Primary Examiner* — Daniell L Negron
*Assistant Examiner* — Regina N Holder (57) ABSTRACT

A disk drive is disclosed comprising a head actuated over a disk comprising a plurality of data tracks. A first defect shape is detected during a manufacturing defect scan of the disk. A second defect shape is detected while the disk drive is deployed in-the-field. Whether the first defect shape is connectable to the second defect shape is determined, and when the first defect shape is connectable to the second defect shape, data sectors along a trajectory between the first defect shape and the second defect shape are relocated.

20 Claims, 7 Drawing Sheets

DISK DRIVE CONNECTING DEFECT SHAPES TO PREEMPT DATA LOSS

BACKGROUND

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track.

Each data sector is typically assigned a physical block address (PBA) which is accessed indirectly through a logical block address (LBA) to facilitate mapping out defective data sectors. A PBA associated with defective data sectors may simply remain unmapped if found during manufacturing, or if a data sector becomes defective while in-the-field (grown defect), the LBA may be remapped to the PBA of a spare data sector (and the data relocated to the spare data sector). The process of initially mapping the LBAs to PBAs and mapping out defective PBAs is referred to as "formatting" the disk.

Scanning for defective sectors during manufacturing of the disk drive typically involves writing a special test pattern to each data sector (e.g., a 2T pattern) and reading the test pattern to identify defects. For example, a drop in the amplitude of the read signal may indicate a defect, or a defect filter matched to a defect signature may indicate a defect, or a number of bit errors exceeding a threshold may indicate a defect, etc. Defects may also be detected while the disk drive is deployed in-the-field, for example, if a data sector becomes unrecoverable using a sector level error correction code (ECC) due to a gown defect.

DETAILED DESCRIPTION OF EMBODIMENTS OF THE INVENTION

Figure 1:
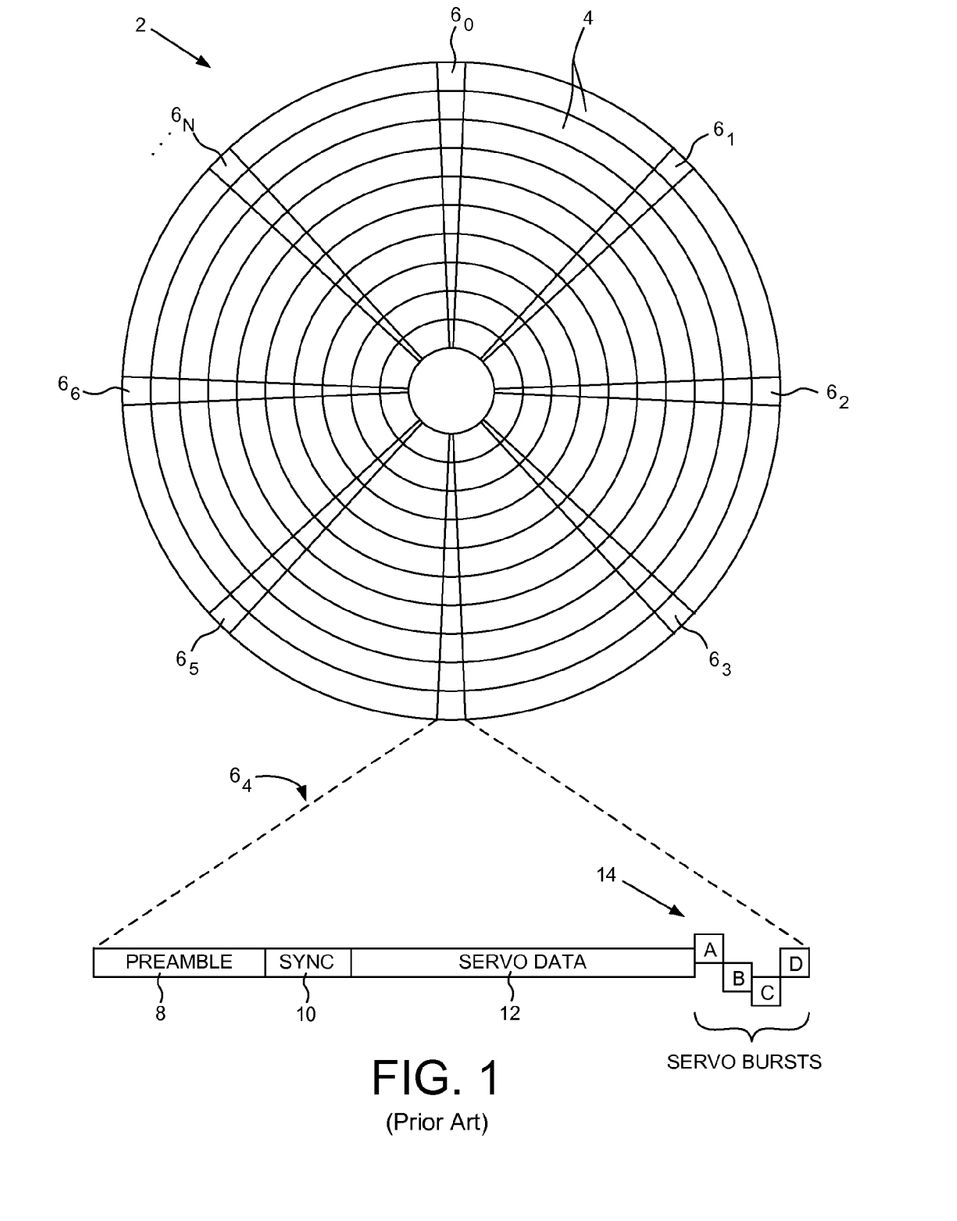
FIG. 1 shows a prior art disk format comprising a plurality of data tracks defined by embedded servo sectors.
Figure 2A:
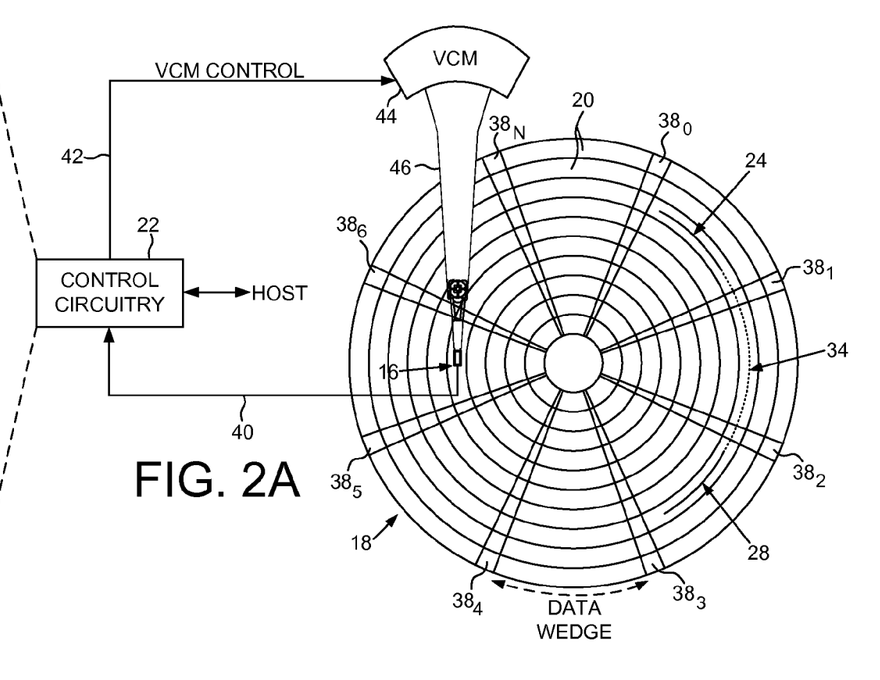
FIG. 2A shows a disk drive according to an embodiment of the present invention comprising a head actuated over a disk, and control circuitry.
Figure 2B:
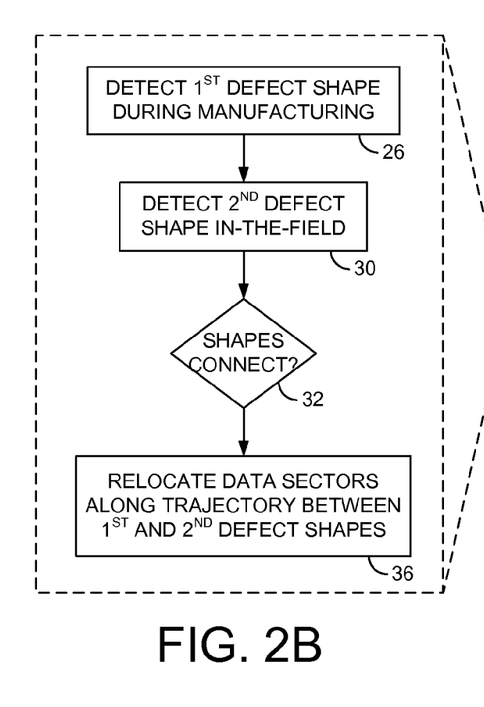
FIG. 2B is a flow diagram executed by the control circuitry according to an embodiment of the present invention wherein a first defect shape detected during manufacturing is connected to a second defect shape detected while in-the-field.

FIG. 2A shows a disk drive according to an embodiment of the present invention comprising a head 16 actuated over a disk 18 comprising a plurality of data tracks 20, and control circuitry 22 for executing the flow diagram of FIG. 2B. A first defect shape 24 is detected during a manufacturing defect scan of the disk (step 26). A second defect shape 28 is detected while the disk drive is deployed in-the-field (step 30). Whether the first defect shape is connectable to the second defect shape is determined (step 32), and when the first defect shape is connectable to the second defect shape, data sectors along a trajectory 34 between the first defect shape and the second defect shape are relocated (step 36).

In the embodiment of FIG. 2A, the disk 18 comprises a plurality of servo sectors $38_0$-$38_N$ that define the plurality of data tracks 20. The control circuitry 22 processes the read signal 40 to demodulate the servo sectors $38_0$-$38_N$ into a position error signal (PES). The PES is filtered with a suitable compensation filter to generate a control signal 42 applied to a voice coil motor (VCM) 44 which rotates an actuator arm 46 about a pivot in order to position the head 16 radially over the disk 18 in a direction that reduces the PES. The servo sectors $38_0$-$38_N$ may comprise any suitable position information, such as a track address for coarse positioning and servo bursts for fine positioning.

In one embodiment, each data track 20 on the disk 18 is divided into a plurality of data sectors accessed through a physical block address (PBA). When detecting defect shapes, each PBA may be assigned a binary value such that the PBAs form a PBA bit map of the disk surface. When a defective data sector is detected, the corresponding bit in the PBA bit map is set. After performing the manufacturing defect scan of the entire disk surface, the PBA bit map is evaluated using a suitable shape recognition algorithm similar to an optical character recognition (OCR) algorithm. In addition, after detecting the existing defect shapes, a suitable algorithm is executed to determine whether any of the shapes are connectable (e.g., by evaluating the center and radius of shapes as described in greater detail below). If a first and second defect shape are connectable, one or more data sectors along the trajectory between the defect shapes are also mapped out and the PBA bit map is updated to reflect that the defect shapes have been connected. This embodiment helps ensure that marginal data sectors not detected during the defect scan but still affected by a defect on the media are mapped out. In other words, if two defect shapes are connectable there is a high probability that a corresponding media defect spans the two defect shapes and therefore the corresponding data sectors are preemptively mapped out to avoid catastrophic data loss.

A defective data sector may be detected using any suitable technique. For example, during the manufacturing defect scan, a predetermined test pattern (e.g., a 2T test pattern) may be written to and read from each data sector. Degradation of the resulting read signal (e.g., amplitude degradation, phase degradation, etc.) may then identify a defective data sector. Alternatively, during manufacturing and/or while the disk drive is in-the-field, a defective data sector may be detected if the number of errors identified by an error correction code (ECC) exceeds a threshold, or if a number of retry operations required to recover a data sector exceeds a threshold.

In one embodiment, the PBA bit map of detective data sectors generated during manufacturing is saved (e.g., in a file on the disk). While the disk drive is in-the-field, the PBA bit map is updated each time a defective data sector is detected. After a predetermined interval (e.g., after a predetermined time or after the number of detected defects exceeds a threshold), the defect shape detection algorithm is executed on the updated PBA bit map as well as the algorithm to determine whether any defect shapes are connectable. If connectable defect shapes are identified, the corresponding data sectors between the defect shapes are relocated and the PBA bit map is updated to reflect that the defect shapes have been connected.

Figure 3A:
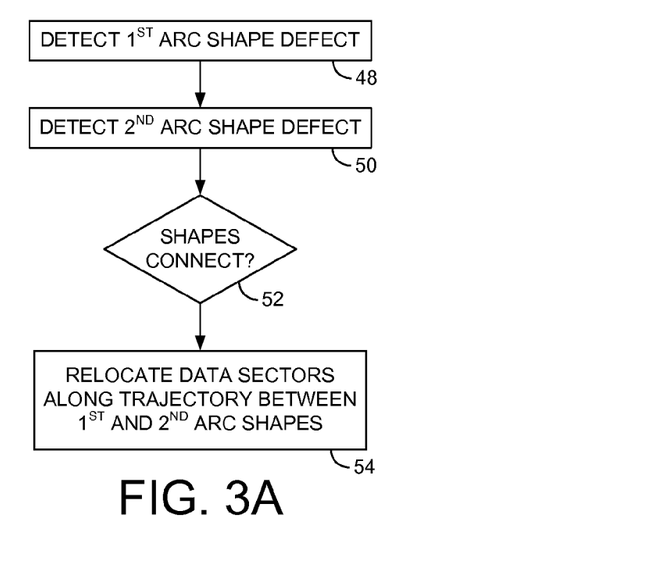
FIG. 3A is a flow diagram according to an embodiment of the present invention wherein the first and second defect shapes comprise an arc shape.
Figure 3B:
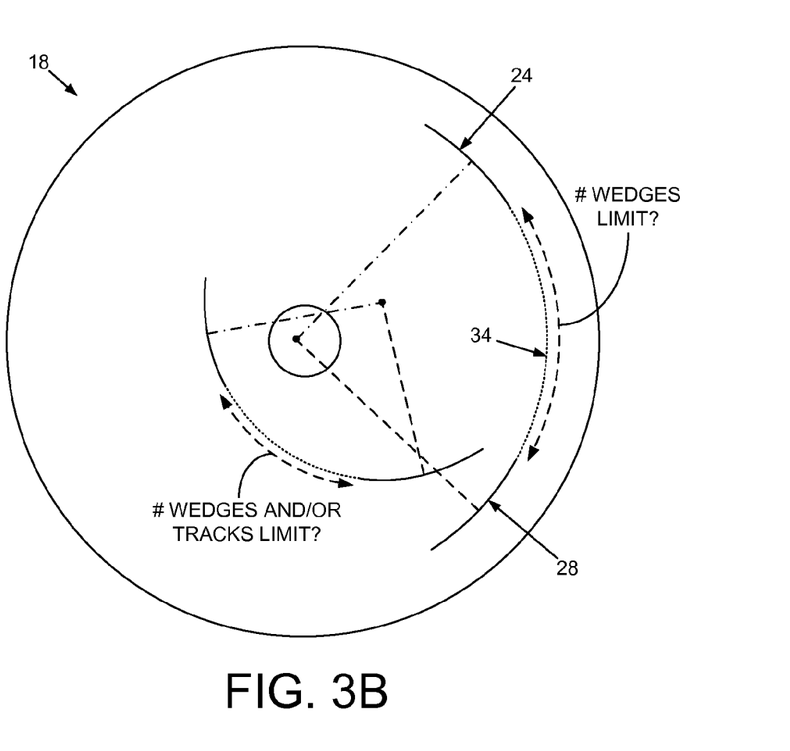
FIG. 3B illustrates an embodiment of the present invention wherein arc shape defects may be along a data track or cut through multiple data tracks.

FIG. 3A shows a flow diagram according to an embodiment of the present invention wherein the first defect shape detected during manufacturing is an arc shape (step 48), and the second defect shape detected while in-the-field comprises an arc shape (step 50). If the two arc shapes are connectable (step 52), the data sectors between the arc shapes are relocated to spare data sectors (step 54). This embodiment is illustrated in FIG. 3B which shows a first arc shape 24 connectable to a second arc shape 28, wherein the data sectors along the trajectory 34 between the arc shapes 24 and 28 are relocated. In an embodiment described below, the two arc shapes 24 and 28 are considered connectable if they share a common center (within a threshold), as well as a common radius (within a threshold) as illustrated in FIG. 3B. In one embodiment, an arc shaped defect may be due to the head contacting and scratching the disk surface during a tracking operation resulting in a shape that follows the arc of a data track. However, an arc shape defect may be due to other reasons, such as a tooling scratch when manufacturing the disk drive, and the arc shape may cut across multiple tracks as illustrated in FIG. 3B.

In one embodiment, whether the first defect shape is connectable to the second defect shape is based on a distance between the first defect shape and the second defect shape. The distance between the defect shapes may be measured in any suitable manner, such as a circumferential distance measured as the number of data sectors or number of data wedges (area between servo sectors). Another distance metric may be a radial distance measured as the number of data tracks between the defect shapes. The defect shapes are considered connectable if the distance is within a threshold. In one embodiment, other characteristics of the defect shapes (e.g., how close the centers match) may be used to adjust the distance threshold. For example, if the centers of the defect shapes are further apart, the distance threshold may be reduced so that the shapes must be closer to be considered connectable.

Figure 4A:
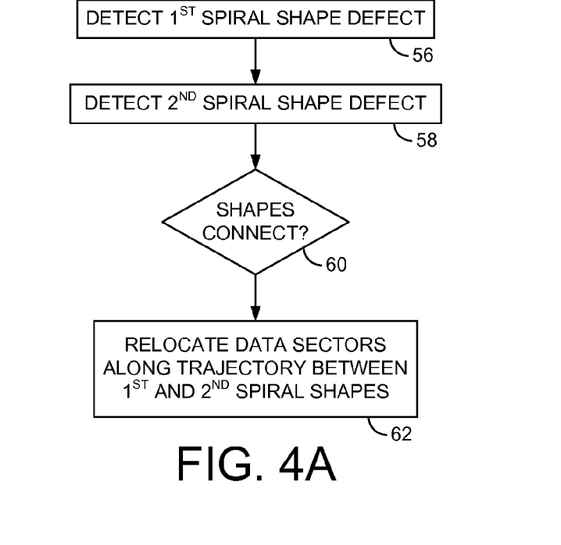
FIG. 4A is a flow diagram according to an embodiment of the present invention wherein the first and second defect shapes comprise a spiral shape.
Figure 4B:
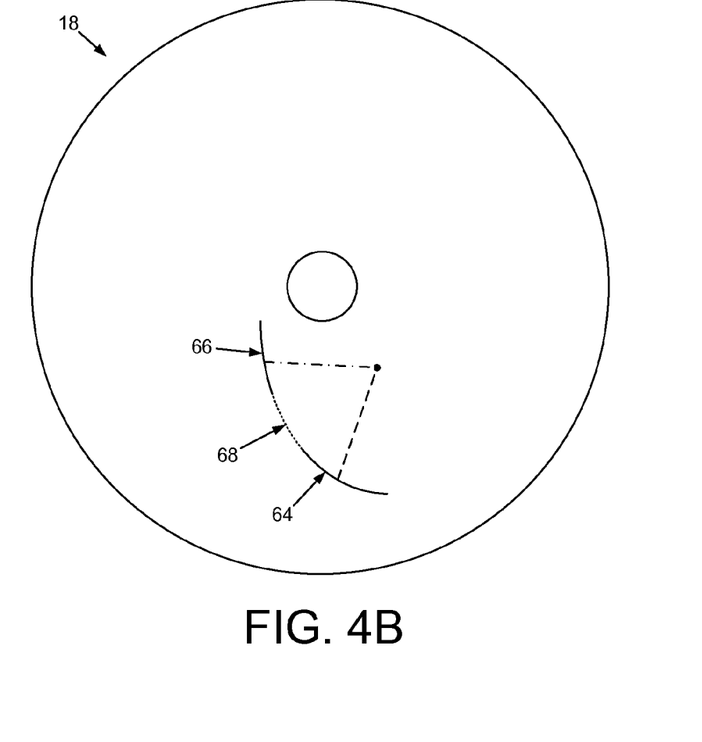
FIG. 4B illustrates spiral shape defects according to an embodiment of the present invention.

Any suitable defect shape may be detected in the embodiments of the present invention. FIG. 4A is a flow diagram according to an embodiment wherein the first defect shape detected during manufacturing is a spiral shape (step 56), and the second defect shape detected while in-the-field comprises a spiral shape (step 58). If the two spiral shapes are connectable (step 60), the data sectors between the spiral shapes are relocated to spare data sectors (step 62). This embodiment is illustrated in FIG. 4B which shows a first spiral shape defect 64 and a second spiral shape defect 66 wherein the data sectors along the trajectory 68 between the spiral shape defects are relocated. A spiral shape defect may be due, for example, to the head contacting the disk surface during a seek operation, or due to a tooling scratch during manufacturing.

Figure 5:
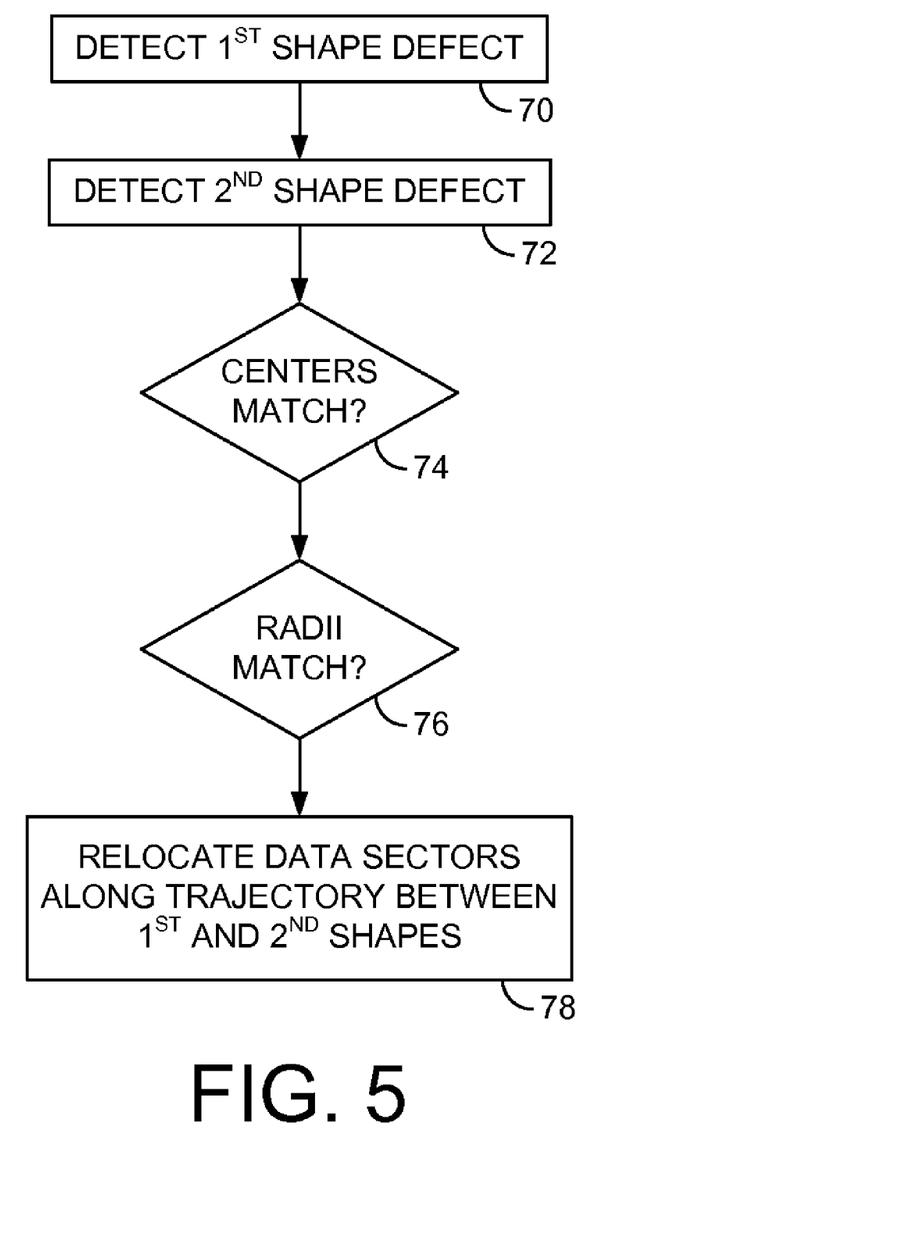
FIG. 5 is a flow diagram according to an embodiment of the present invention wherein the first and second defect shapes are connectable if they share a common center and if their radius are consistent with the defect shapes (e.g., arcs or spirals).

Any suitable algorithm may be employed to determine whether the defect shapes are connectable. FIG. 5 is a flow diagram according to an embodiment wherein after detecting a first defect shape (step 70) and a second defect shape (step 72), the centers of the defect shape are evaluated (step 74). If the centers of the defect shapes match within a threshold (step 74), the radii of the defect shapes are evaluated (step 76). If the radii are consistent with the defect shapes, then the data sectors between the defect shapes are relocated (step 78). Referring again to FIG. 3B, the center of the arc shape defect 24 matches the center of the arc shape defect 28, and the radii also match within a threshold, so the defect shapes are considered connectable. Similarly in FIG. 4B, the center of the spiral shape defects 64 and 66 match, and the radii are consistent with the trajectory of the spiral shapes, so the defect shapes are considered connectable.

Figure 6A:
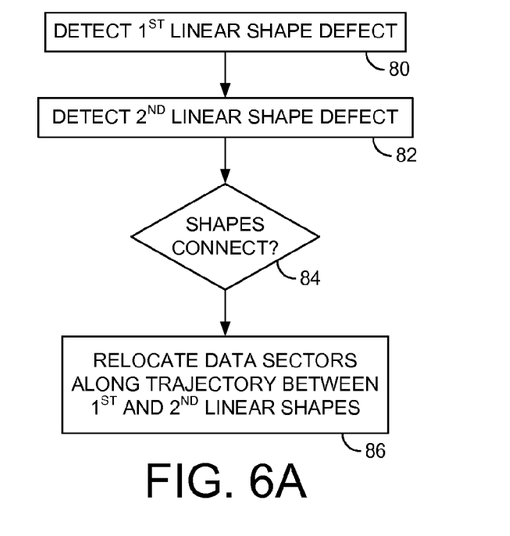
FIG. 6A is a flow diagram according to an embodiment of the present invention wherein the first and second defect shapes comprise a linear shape.
Figure 6B:
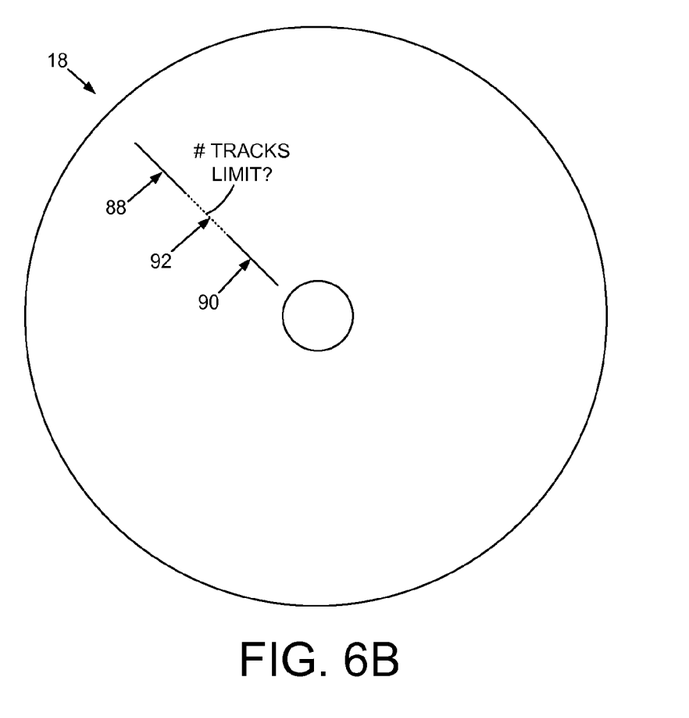
FIG. 6B illustrates linear shape defects according to an embodiment of the present invention.

FIG. 6A is a flow diagram according to an embodiment wherein the first defect shape detected during manufacturing is a linear shape (step 80), and the second defect shape detected while in-the-field comprises a linear shape (step 82). If the two linear shapes are connectable (step 84), the data sectors between the linear shapes are relocated to spare data sectors (step 86). This embodiment is illustrated in FIG. 6B which shows a first linear shape defect 88 and a second linear shape defect 90 wherein the data sectors along the trajectory 92 between the linear shape defects are relocated. A linear shape defect may be due, for example, to a tooling scratch during manufacturing while the disk is stationary.

Figure 7A:
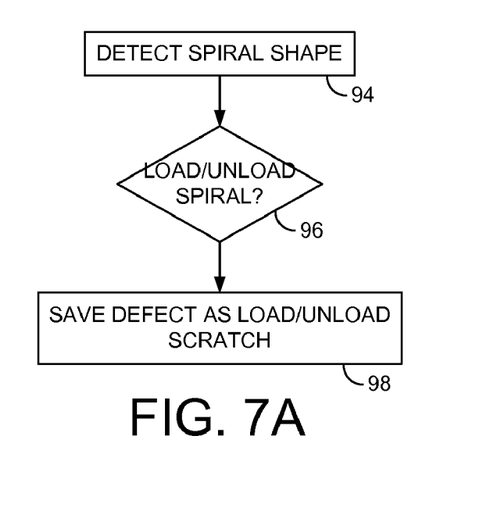
FIG. 7A is a flow diagram according to an embodiment of the present invention wherein a spiral shape defect may be detected that is caused during a load or unload operation.

FIG. 7A is a flow diagram according to an embodiment of the present invention wherein if a spiral shape defect is detected (step 94), and the spiral shape defect is consistent with the head contacting the surface of the disk during a load or unload operation (step 96), then the defect is logged as a load/unload scratch. In this manner, when a disk drive is returned to a manufacturer for being defective, the defect log can be evaluated to determine whether the failure is related to load/unload scratches. If load/unload scratches are detected, appropriate remedial actions may be taken during manufacturing of future disk drives to address the problem. In another embodiment, when a spiral shape defect is detected consistent with a load/unload scratch, certain parameters of the load/unload operation may be modified while the disk drive is in-the-field to address the problem. For example, the velocity of the head during load/unload may be adjusted to reduce the probability of a scratch occurring. In yet another embodiment, detecting load/unload scratches may be used to predict an imminent drive failure so that the disk drive can be replaced before experiencing catastrophic data loss.

Figure 7B:
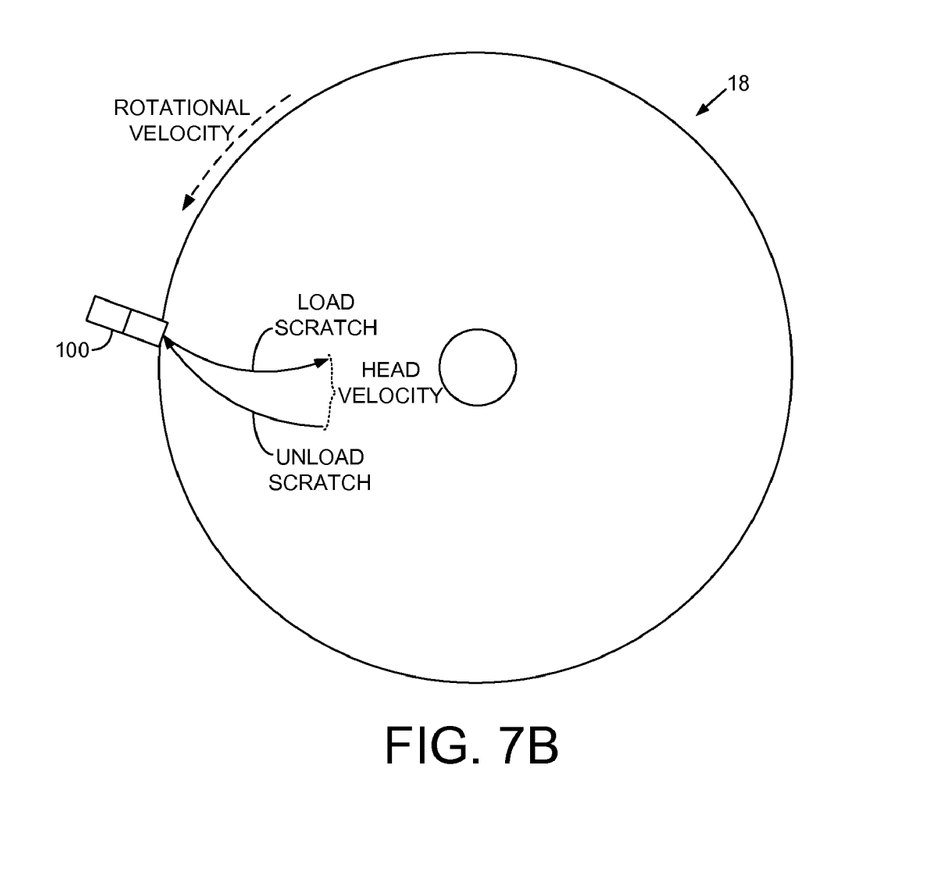
FIG. 7B illustrates a spiral shape defect caused by an unload or load operation according to an embodiment of the present invention.

A load scratch is illustrated in FIG. 7B which occurs when the head contacts the disk surface as it is loaded off a ramp 100 over the disk surface. Similarly, an unload scratch occurs when the head contacts the disk surface as it is unloaded from the disk surface back onto the ramp 100. The spiral shape of a load/unload scratch will vary depending on the rotational velocity of the disk as well as the radial velocity of the head. Therefore, in one embodiment a target spiral shape corresponding to a load/unload scratch is predetermined (e.g., theoretically or experimentally) and then used as a comparison to a spiral shape defect detected in each disk drive. The comparison may be performed in any suitable manner, such as a bit map comparison or by computing and comparing specific geometries of the spiral shapes. For example, the center of a spiral shape defect should be consistent with the rotational velocity of the disk, the radial velocity of the head, and the arc shape trajectory of the head as the actuator arm rotates about its pivot. The spiral shape of a load scratch will vary from the spiral shape of an unload scratch (due to the directional movement of the head), and therefore the geometry (e.g., the center) of the corresponding spiral shapes will differ.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
  a disk comprising a plurality of data tracks;
  a head actuated over the disk; and
  control circuitry operable to;
  detect a first defect shape during a manufacturing defect scan of the disk;
  detect a second defect shape while the disk drive is deployed in-the-field;
  determine whether the first defect shape is connectable to the second defect shape; and
  when the first defect shape is connectable to the second defect shape, relocate data sectors along a trajectory between the first defect shape and the second defect shape,
  wherein the control circuitry is further operable to detect a spiral shape defect associated with one of loading the head off a ramp and unloading the head onto the ramp.

2. The disk drive as recited in claim 1, wherein the control circuitry is further operable to determine whether the first defect shape is connectable to the second defect shape based on a distance between the first defect shape and the second defect shape.

3. The disk drive as recited in claim 1, wherein the control circuitry is further operable to:
  detect a first center of the first defect shape;
  detect a second center of the second defect shape; and
  determine that the first defect shape is connectable to the second defect shape when the first center substantially matches the second center.

4. The disk drive as recited in claim 3, wherein the control circuitry is further operable to:
  detect a first radius of the first defect shape relative to the first center;
  detect a second radius of the second defect shape relative to the second center; and
  determine that the first defect shape is connectable to the second defect shape when the first radius is consistent with the second radius.

5. The disk drive as recited in claim 1, wherein the control circuitry is further operable to detect the spiral shape defect relative to a rotational velocity of the disk.

6. The disk drive as recited in claim 1, wherein the control circuitry is further operable to detect the spiral shape defect relative to a radial velocity of the head.

7. A method of operating a disk drive, the disk drive comprising a head actuated over a disk comprising a plurality of data tracks, the method comprising:
  detecting a first defect shape during a manufacturing defect scan of the disk;
  detecting a second defect shape while the disk drive is deployed in-the-field;
  determining whether the first defect shape is connectable to the second defect shape; and
  when the first defect shape is connectable to the second defect shape, relocating data sectors along a trajectory between the first defect shape and the second defect shape,
  the method further comprising detecting a spiral shape defect associated with one of loading the head off a ramp and unloading the head onto the ramp.

8. The method as recited in claim 7, wherein determining whether the first defect shape is connectable to the second defect shape is based on a distance between the first defect shape and the second defect shape.

9. The method as recited in claim 7, further comprising:
  detecting a first center of the first defect shape;
  detecting a second center of the second defect shape; and
  determining that the first defect shape is connectable to the second defect shape when the first center substantially matches the second center.

10. The method as recited in claim 9, further comprising:
  detecting a first radius of the first defect shape relative to the first center;
  detecting a second radius of the second defect shape relative to the second center; and
  determining that the first defect shape is connectable to the second defect shape when the first radius is consistent with the second radius.

11. The click drive method as recited in claim 7, further comprising detecting the spiral shape defect relative to a rotational velocity of the disk.

12. The method as recited in claim 7, further comprising detecting the spiral shape defect relative to a radial velocity of the head.

13. A disk drive comprising:
  a disk comprising a plurality of data tracks;
  a head actuated over the disk; and
  control circuitry operable to;
  detect a first defect shape during a manufacturing defect scan of the disk;
  detect a second defect shape while the disk drive is deployed in-the-field;
  determine whether the first defect shape is connectable to the second defect shape; and
  when the first defect shape is connectable to the second defect shape, relocate data sectors along a trajectory between the first defect shape and the second defect shape, wherein the control circuitry is further operable to:
  detect a first center of the first defect shape;
  detect a second center of the second defect shape; and
  determine that the first defect shape is connectable to the second defect shape when the first center substantially matches the second center.

14. The disk drive as recited in claim 13, wherein the control circuitry is further operable to:
  detect a first radius of the first defect shape relative to the first center;
  detect a second radius of the second defect shape relative to the second center; and
  determine that the first defect shape is connectable to the second defect shape when the first radius is consistent with the second radius.

15. The disk drive as recited in claim 13, wherein the first defect shape comprises an arc shape and the second defect shape comprises an arc shape.

16. The disk drive as recited in claim 13, wherein the first defect shape comprises a spiral shape and the second defect shape comprises a spiral shape.

17. A method of operating a disk drive, the disk drive comprising a head actuated over a disk comprising a plurality of data tracks, the method comprising:
  detecting a first defect shape during a manufacturing defect scan of the disk;
  detecting a second defect shape while the disk drive is deployed in-the-field;
  determining whether the first defect shape is connectable to the second defect shape; and
  when the first defect shape is connectable to the second defect shape, relocating data sectors along a trajectory between the first defect shape and the second defect shape,
the method further comprising:
  detecting a first center of the first defect shape;
  detecting a second center of the second defect shape; and
  determining that the first defect shape is connectable to the second defect shape when the first center substantially matches the second center.

18. The method as recited in claim 17, further comprising:
  detecting a first radius of the first defect shape relative to the first center;
  detecting a second radius of the second defect shape relative to the second center; and
  determining that the first defect shape is connectable to the second defect shape when the first radius is consistent with the second radius.

19. The method as recited in claim 17, wherein the first defect shape comprises an arc shape and the second defect shape comprises an arc shape.

20. The method as recited in claim 17, wherein the first defect shape comprises a spiral shape and the second defect shape comprises a spiral shape.

* * * * *